Figure 1:
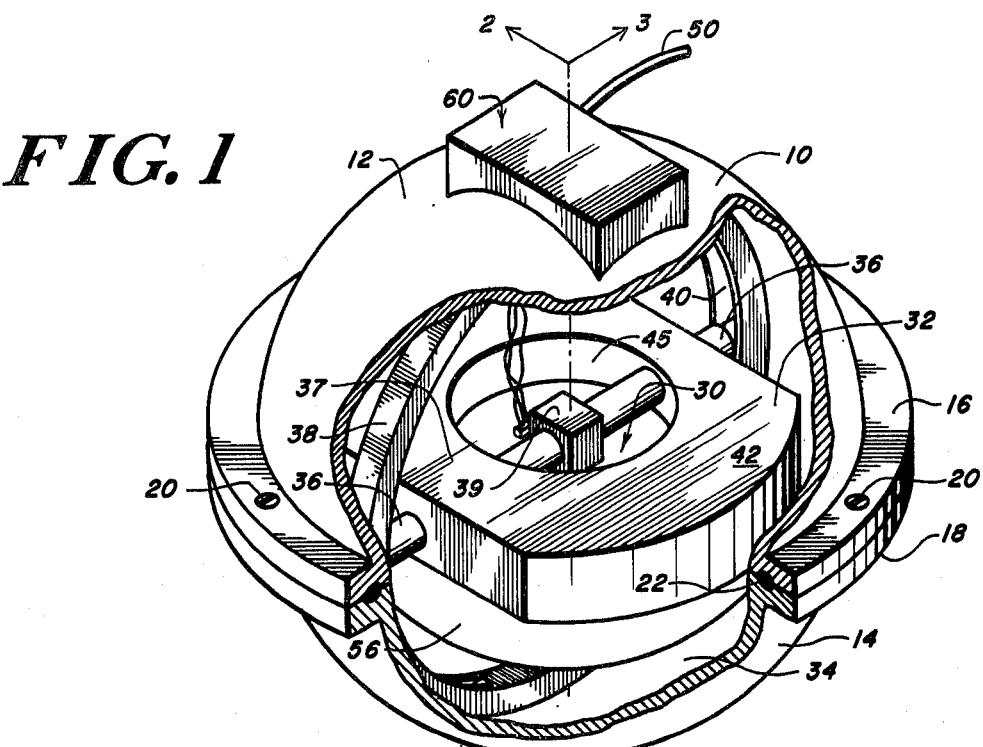

United States Patent [19]

Clements

[11] 4,432,498

[45] Feb. 21, 1984

[54] METHOD AND APPARATUS FOR DISPOSING OF ANIMAL WASTE

[76] Inventor: Aynon L. Clements, 7165 N. Oakbank Dr., Glendora, Calif. 91740

[21] Appl. No.: 57,884

[22] Filed: Jul. 16, 1979

[51] Int. Cl.³ .............................................. B02C 23/18
[52] U.S. Cl. ...................................... 241/21; 210/600; 210/542; 241/39; 241/DIG. 38; 119/1; 366/167
[58] Field of Search ................ 71/15, 21, 64 C; 119/1; 137/101.11, 205.5, 268; 210/1, 3, 4, 10, 14, 65, 69, 735, 194, 257.1, 258, 416.1, 512.1, 600, 609, 751, 767, 772, 542; 241/26, 46.17, 284, DIG. 38, 21, 39; 366/101, 167; 15/1.7; 239/310, 317

[56] References Cited

U.S. PATENT DOCUMENTS

| | | | |
|---|---|---|---|
| 1,063,468 | 6/1913 | Pribil | 210/416 R |
| 1,085,348 | 1/1914 | Ledoux | 137/205.5 |
| 1,713,791 | 5/1929 | Titcomb | 210/174 |
| 2,843,139 | 7/1958 | Montel et al. | 137/101.11 |
| 3,068,885 | 12/1962 | Lawrence | 137/205.5 |
| 3,155,375 | 11/1964 | Vaughan | 366/297 |
| 3,165,114 | 1/1965 | Garrett | 239/317 |
| 3,194,444 | 7/1965 | Hubert | 137/205.5 |
| 3,271,304 | 9/1966 | Valdespino et al. | 210/14 |
| 3,367,583 | 2/1968 | Kellogg | 241/46.17 |
| 3,784,116 | 1/1974 | Buckman et al. | 241/DIG. 38 |
| 3,864,255 | 2/1975 | Swanson | 210/73 SG |
| 3,960,718 | 6/1976 | Lebo | 210/14 |
| 3,971,720 | 7/1976 | Swanson et al. | 210/257.1 |
| 3,997,437 | 12/1976 | Prince et al. | 210/14 |

*Primary Examiner*—Peter A. Hruskoci
*Attorney, Agent, or Firm*—Sellers and Brace

[57] ABSTRACT

Method and apparatus for hydraulically disposing of animal waste utilizing a water container in which the waste is stored temporarily. Duct work supported in the container is connected to a pressurized water source effective to aspirate water and waste into a submerged inlet and conducting it to a place of waste disposal. A jet of pressurized water aids in comminuting the waste, circulating the same past the waste inlet, and in flushing away larger elements tending to obstruct the inlet.

9 Claims, 2 Drawing Figures

METHOD AND APPARATUS FOR DISPOSING OF ANIMAL WASTE

This invention relates to the disposition of animal waste, and more particularly to an improved method and apparatus for temporarily storing waste submerged in water and periodically utilizing pressurized water source to aspirate the container contents and flush the same to a point of disposal.

BACKGROUND OF THE INVENTION

The disposal of waste from animals generally and particularly from horses and pets of persons living in urban and other congested areas poses numerous and costly problems. These problems are particularly vexing and burdensome as respects larger animals such as horses where the waste includes large quantities of bulky bedding material such as straw, sawdust and the like. Urban authorities customarily require that horse waste be stored in closed containers and collected for transport to dumps or other places at frequent intervals.

There is a dirth of prior teachings dealing with the problem. A patent to Supplee U.S. Pat. No. 1,813,329 provides an apparatus for disposing of waste of small animals to a sewer utilizing a modified type of conventional water closet recessed into a floor. However, this device is quite unsuitable for horse manure for various reasons including lack of any provision for comminuting the waste before introduction into the sewer.

A review of patents dealing with hydraulic aspirating devices designed for a wide variety of applications has uncovered Stone U.S. Pat. No. 4,020,613; Burg U.S. Pat. No. 1,212,004; Scharfe U.S. Pat. No. 2,948,233; Chapman U.S. Pat. No. 1,908,220; Moffat et al U.S. Pat. No. 2,563,674; and Brown U.S. Pat. No. 1,068,102. However, the disclosures of no one of these patents are neither designed for nor useful in disposing of the type of animal waste dealt with so satisfactorily by this invention. The shortcomings and disadvantages of these devices for the purposes here contemplated are believed self-evident from a casual review of their respective teachings.

SUMMARY OF THE INVENTION

The shortcomings and disadvantages of prior hydraulic disposal equipment for use in disposing of animal waste and particularly waste of the type including straw, sawdust and the like bedding materials are avoided by this invention. The apparatus uses a simple ducting arrangement readily supportable across the top of a standard drum or like container of water in which the waste is temporarily submerged and stored to shield it from flies, insects and the like while softening and promoting the disintegration thereof. The ducting includes an aspirating jet connectable to a pressurized water source usable to aspirate the waste and convey it to a place of disposal. A second jet connected to the water source serves multiple functions including comminuting the waste, circulating the container contents past the waste inlet, and flushing away larger particles tending to interfere with flow into the inlet.

Accordingly it is a primary object of this invention to provide a simple, highly effective method and apparatus for the disposal of animal waste including straw and the like bedding materials.

Another object of the invention is the provision of a simple rugged apparatus utilising pressurized water to dispose of animal waste.

These and other more specific objects will appear upon reading the following specification and claims and upon considering in connection therewith the attached drawing to which they relate.

Figure 2:
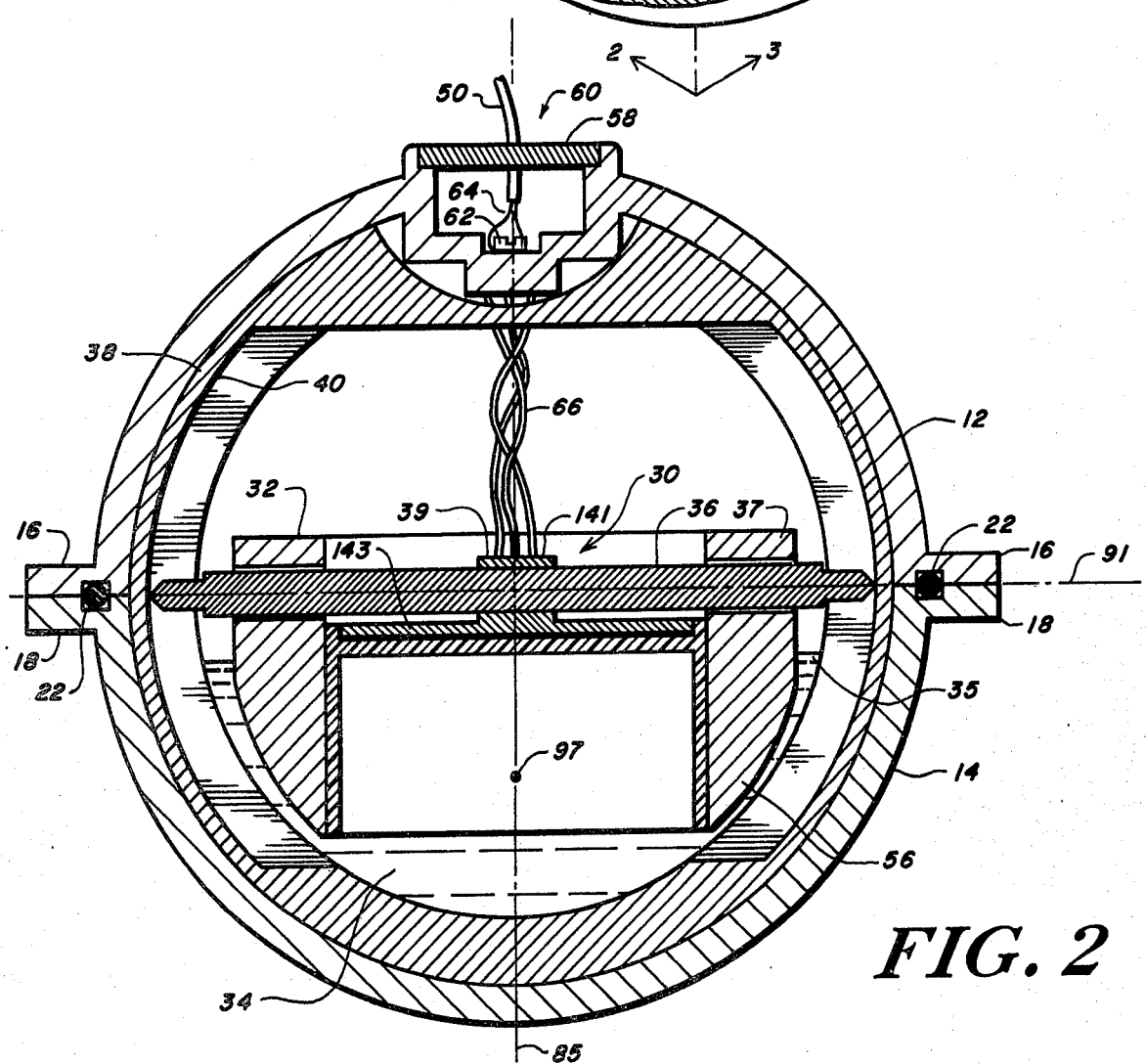
Figure 3:
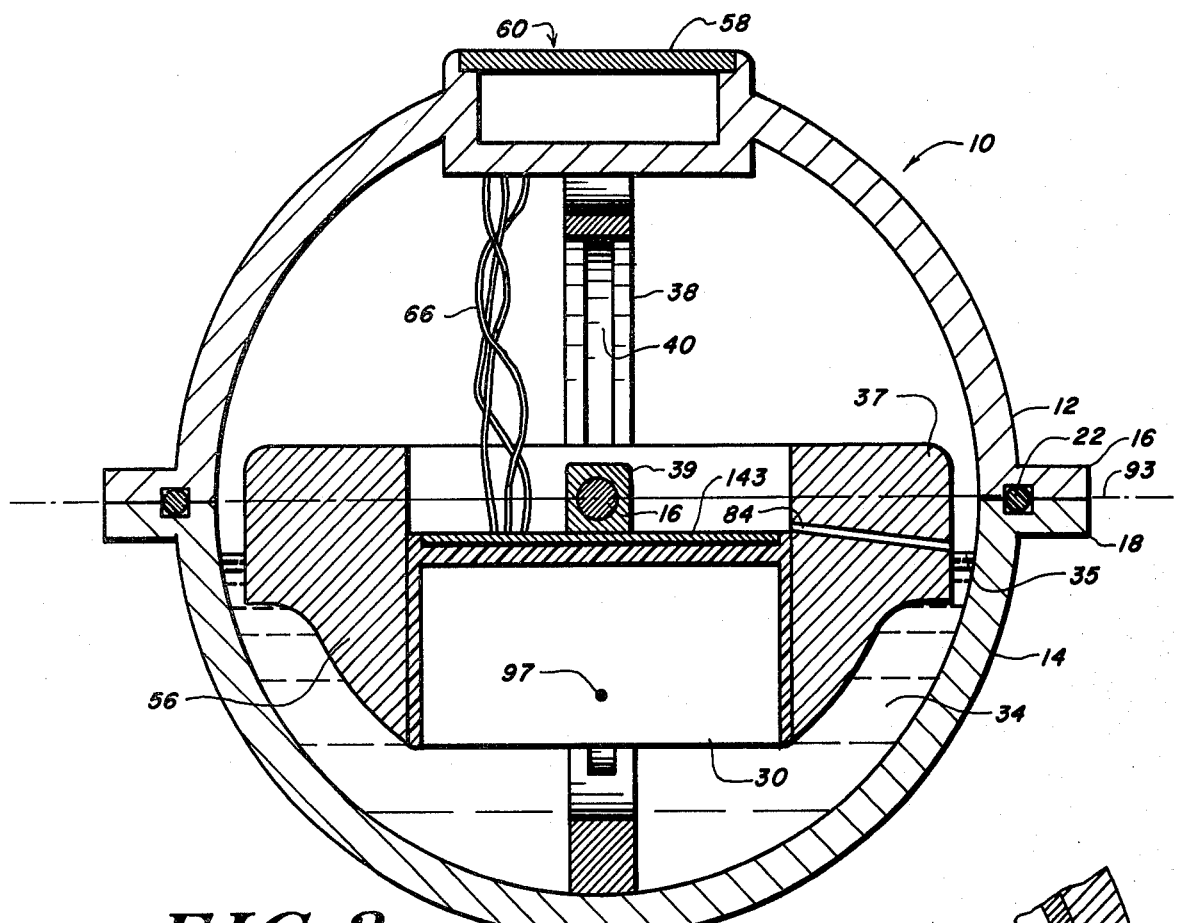
Figure 5:
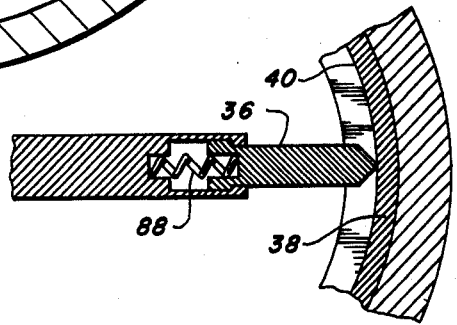
Figure 4:
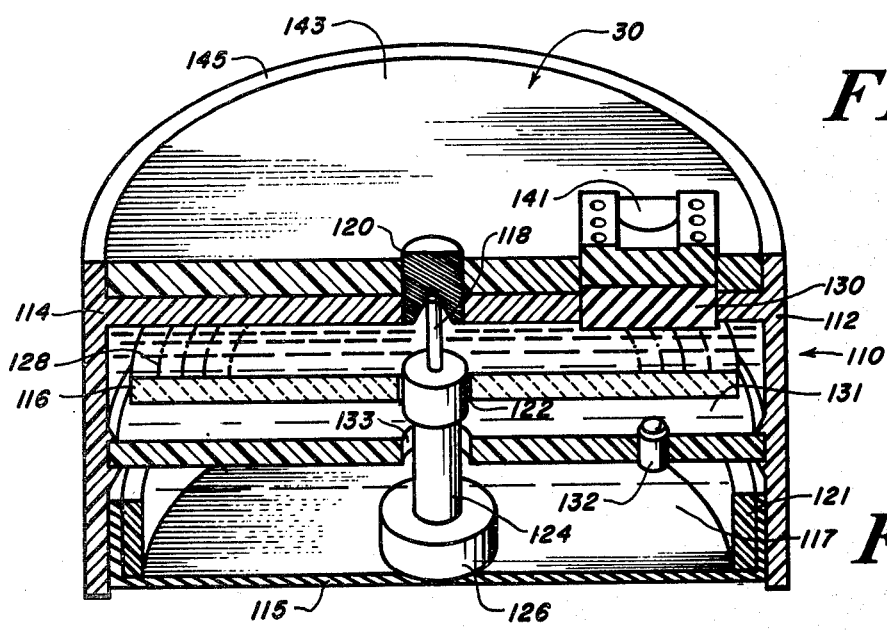
Figure 1:
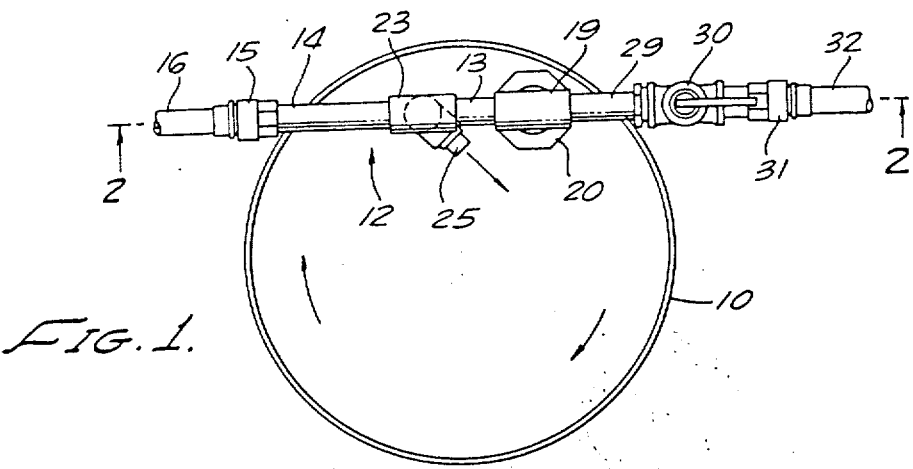
Figure 2:
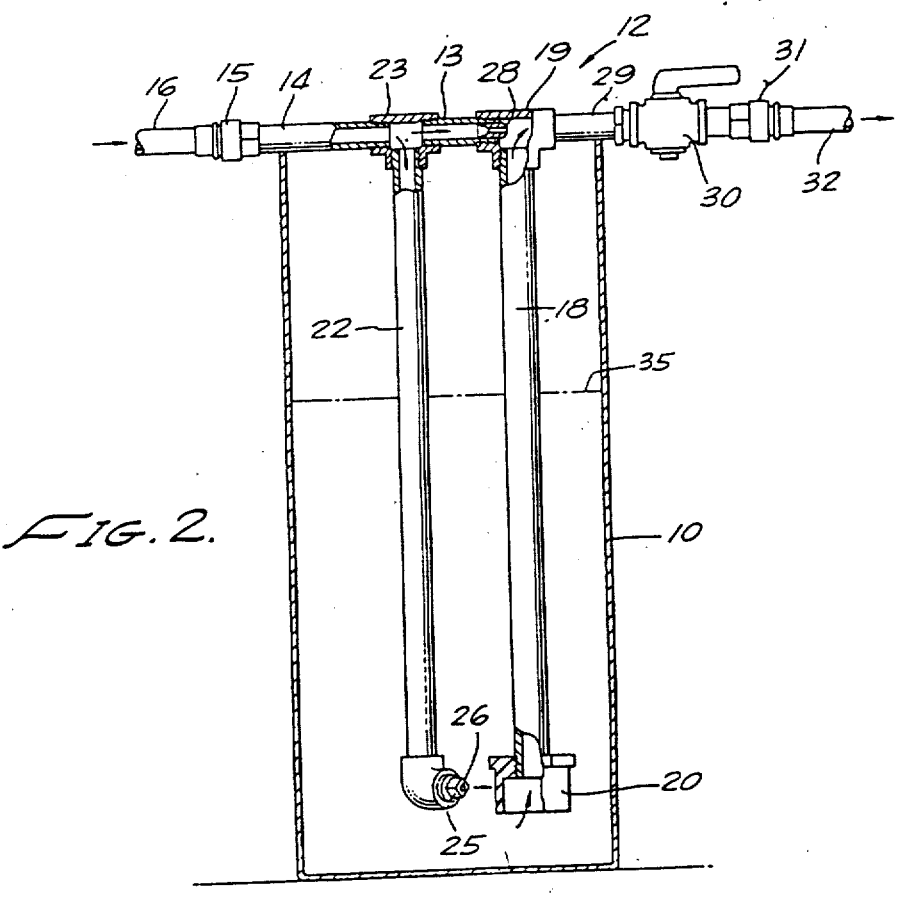

Referring now to the drawing in which a preferred embodiment of the invention is illustrated:

FIG. 1 is a top plan view of an illustrative embodiment of apparatus for practising this invention; and FIG. 2 is a cross sectional view taken along line 2—2 on FIG. 1.

Referring to FIGS. 1 and 2, there is shown waste disposal apparatus comprising an upright container such as a garbage container, or an oil drum 10 having its top removed, supporting crosswise of its rim the hydraulic aspirating apparatus, designated generally 12. The main body of aspirator 12 is of generally inverted U-shape having one end of its bight portion 13 provided with a pressurized water inlet 14 equipped with a coupling 15 connectable to a water supply hose 16. A first upright or riser leg 18 is connected to bight 13 by a T fitting 19. Leg 18 terminates in a downwardly cup shaped water and waste inlet 20. A second leg 22 is connected to bight 13 by T fitting 23 and its lower end is provided with a stationary water jetting nozzle 25 having a port 26 jetting water generally tangentially past the inlet fitting 20.

The bight portion 13 is here shown as provided with a stationary aspirating nozzle 28 for jetting water crosswise of the upper end of leg 18 and generally axially into the outlet duct 29. This outlet duct is preferably provided with a ball or the like cut-off valve 30 and a coupling 31 for use in coupling the discharge hose 32 to duct 29. Hose 32 may lead to the sewer or discharge over topsoil in the vicinity of the premises in order that the finely divided waste may be utilized to fertilise the soil.

The operation of the waste disposal device will be readily apparent from the foregoing description of the structure. Typically, the user connects hose 16 to any pressurized water supply and turns on the valve at the inlet end of hose 16 and closes the valve 30 thereby to fill container 10 to a suitable level somewhat above mid-level as indicated at 35. Both valves are then closed and the user forks the waste into the top of container 10 wherein it is submerged in water to blanket odors and protect it from contact by flies and insects. Usually it is desirable to let the waste soak and more or less disintegrate for a period of several days.

Disposal of the waste is accomplished by increasing the water level in the container if necessary by turning on the inlet valve, not shown, while ball valve 30 remains closed. When the water level approaches the top of the container, valve 30 is opened placing the aspirator nozzle 28 in full operation. Concurrently therewith, a second vigorous jet of water issues from nozzle 26 to assure complete disintegration of the waste and to rotate the water and the waste about the interior of the container and past inlet fitting 20, and to flush away any larger particles tending to obstruct the flow into inlet fitting 20. The aspirator promotes a steady flow of water and waste material upwardly through duct 18 and to the right along duct 29 and hose 32.

On occasion, the inlet fitting 20 or the riser 18 may become obstructed. In this event it is a simple matter to dislodge the obstructing material by closing valve 30 briefly to provide a pressurized back flow of water downwardly through riser 18. The obstructing matter is quickly cleared away whereupon valve 30 is restored to its open position.

In an alternate mode of use, the user may fork the waste into the empty container to a suitable depth following which the back flushing valve 30 is closed and the container is filled with water by fully opening the water inlet valve. A strong jet of water issues from nozzle 26 disintegrating waste in its path. Other waste enters through riser 18. As the bottom of the container becomes flooded, the jet from nozzle 26 starts to rotate the contents vigorously thereby circulating other waste into the path of the jet where it is thoroughly disintegrated. After the container is filled with the rotating body of water and waste, valve 30 is opened and the container contents are flushed away in the same manner described above.

While the particular method and apparatus for disposing of animal waste herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

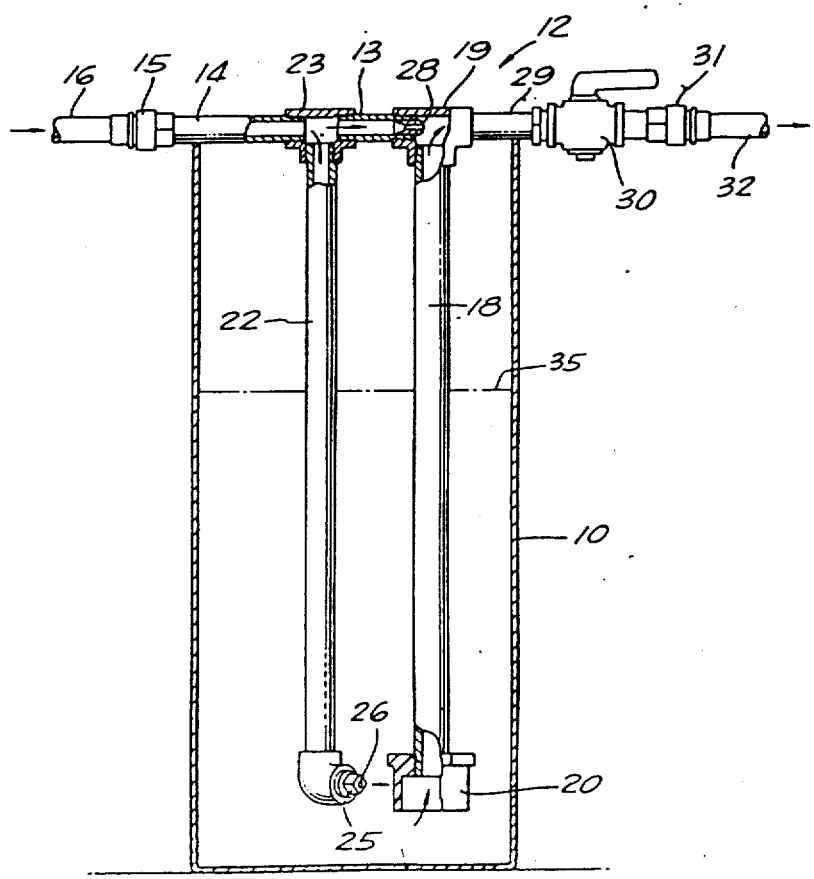

I claim:

1. That method of hydraulically processing animal waste including straw and the like bedding material and conducting the same to a place of disposal in finely comminuted form which consists of:
    submerging the animal waste and bedding material in a body of water confined in a container;
    injecting a jet of pressurized water into said body of water from a stationary nozzle near the bottom of said container in a manner to rotate a major portion of said water, and said animal waste and bedding material in the path of said jet and comminuting the same into smaller increments; and
    simultaneously circulating another stream of said pressurized water through aspirating duct means having a submerged inlet port to aspirate the comminuted animal waste, bedding material and water from said body of water into said duct means and conducting the same to a place of disposal.

2. That method defined in claim 1 characterized in the steps of utilizing an upright container to confine said body of water, conducting said pressurized water through inverted U-shaped aspirating duct means having the bight portion thereof extending crosswise of said container, and locating said inlet port near the bottom of said container.

3. That method defined in claim 1 characterized in the step of directing said jet of water past said inlet port and sufficiently close thereto to flush away portions of the animal waste and bedding material tending to interfere with the free flow thereof into said inlet port.

4. That method defined in claim 1 characterized in the steps of utilizing a generally cylindrical open topped container for said body of water, locating said inlet port near a lower interior sidewall portion of said container, and jetting said stream of water past said inlet port and in a manner tending to rotate the liquid and solid contents of said container about a generally upright axis.

5. That method defined in claim 2 characterized in the step of supporting said aspirating duct means crosswise of the top rim of said container with the inlet port of said duct means at a level adjacent the bottom of said container.

6. That method defined in claim 5 characterized in the step of facing said inlet port downwardly toward the bottom of said container.

7. Apparatus for hydraulically conducting animal waste and bedding material associated therewith to a place of disposal comprising:
    elongated duct means having an inlet at one end connectable to a source of pressurized water and an outlet at the other end thereof;
    said duct means including a second duct having an inlet for animal waste and bedding material adapted to be submerged near the bottom of a container of water, animal waste and bedding material and having an outlet opening into said duct means between the said inlet and outlet of said duct means;
    means interiorly of said duct means for jetting water from said water inlet past said outlet of said second duct thereby to aspirate said animal waste and bedding material into said duct means; and
    said duct means including a third duct having stationary nozzle means for jetting a stream of pressurized water past the exterior of said inlet for animal waste and bedding material and effective to circulate major portions thereof past said animal waste and bedding material inlet as other portions of said animal waste and bedding material are aspirated thereinto.

8. Apparatus as defined in claim 7 characterized in that said duct means is generally inverted U-shape with one leg thereof comprising said second duct having an unobstructed water and waste inlet, and the lower end of the other leg comprising said third duct having said stationary nozzle positioned to jet a stream of water tangentially past the said inlet of said second duct and effective to rotate the contents of said container.

9. Apparatus as defined in claim 8 characterized in that the lower end of said one leg is provided with an inverted cup-shaped water, waste and bedding material inlet fitting.

* * * * *

UNITED STATES PATENT AND TRADEMARK OFFICE
CERTIFICATE OF CORRECTION

PATENT NO. : 4,432,498

DATED : February 21, 1984

INVENTOR(S) : Aynon L. Clements

It is certified that error appears in the above-identified patent and that said Letters Patent is hereby corrected as shown below:

The title page should be deleted to appear as per attached title page.

The sheets of drawings containing figures 1-5 should be deleted to be replaced with figures 1 and 2 as shown on the attached sheet.

*Signed and Sealed this*

*Eighteenth* Day of *June 1985*

[SEAL]

*Attest:*

DONALD J. QUIGG

*Attesting Officer*     *Acting Commissioner of Patents and Trademarks*

United States Patent [19]

Clements

[11] 4,432,498

[45] Feb. 21, 1984

[54] METHOD AND APPARATUS FOR DISPOSING OF ANIMAL WASTE

[76] Inventor: Aynon L. Clements, 7165 N. Oakbank Dr., Glendora, Calif. 91740

[21] Appl. No.: 57,884

[22] Filed: Jul. 16, 1979

[51] Int. Cl.³ .......................................... B02C 23/18
[52] U.S. Cl. ................................. 241/21; 210/600; 210/542; 241/39; 241/DIG. 38; 119/1; 366/167
[58] Field of Search ............... 71/15, 21, 64 C; 119/1; 137/101.11, 205.5, 268; 210/1, 3, 4, 10, 14, 65, 69, 735, 194, 257.1, 258, 416.1, 512.1, 600, 609, 751, 767, 772, 542; 241/26, 46.17, 284, DIG. 38, 21, 39; 366/101, 167; 15/1.7; 239/310, 317

[56] References Cited

U.S. PATENT DOCUMENTS

| 1,063,468 | 6/1913 | Pribil | 210/416 R |
| 1,085,348 | 1/1914 | Ledoux | 137/205.5 |
| 1,713,791 | 5/1929 | Titcomb | 210/174 |
| 2,843,139 | 7/1958 | Montel et al. | 137/101.11 |
| 3,068,885 | 12/1962 | Lawrence | 137/205.5 |
| 3,155,375 | 11/1964 | Vaughan | 366/297 |
| 3,165,114 | 1/1965 | Garrett | 239/317 |
| 3,194,444 | 7/1965 | Hubert | 137/205.5 |
| 3,271,304 | 9/1966 | Valdespino et al. | 210/14 |
| 3,367,583 | 2/1968 | Kellogg | 241/46.17 |
| 3,784,116 | 1/1974 | Buckman et al. | 241/DIG. 38 |
| 3,864,255 | 2/1975 | Swanson | 210/73 SG |
| 3,960,718 | 6/1976 | Lebo | 210/14 |
| 3,971,720 | 7/1976 | Swanson et al. | 210/257.1 |
| 3,997,437 | 12/1976 | Prince et al. | 210/14 |

Primary Examiner—Peter A. Hruskoci
Attorney, Agent, or Firm—Sellers and Brace

[57] ABSTRACT

Method and apparatus for hydraulically disposing of animal waste utilizing a water container in which the waste is stored temporarily. Duct work supported in the container is connected to a pressurized water source effective to aspirate water and waste into a submerged inlet and conducting it to a place of waste disposal. A jet of pressurized water aids in comminuting the waste, circulating the same past the waste inlet, and in flushing away larger elements tending to obstruct the inlet.

9 Claims, 2 Drawing Figures